M. Marshall,
Shoe-Pegging Machine,
No. 1296
Reissued March 25, 1862
Fig. 1.
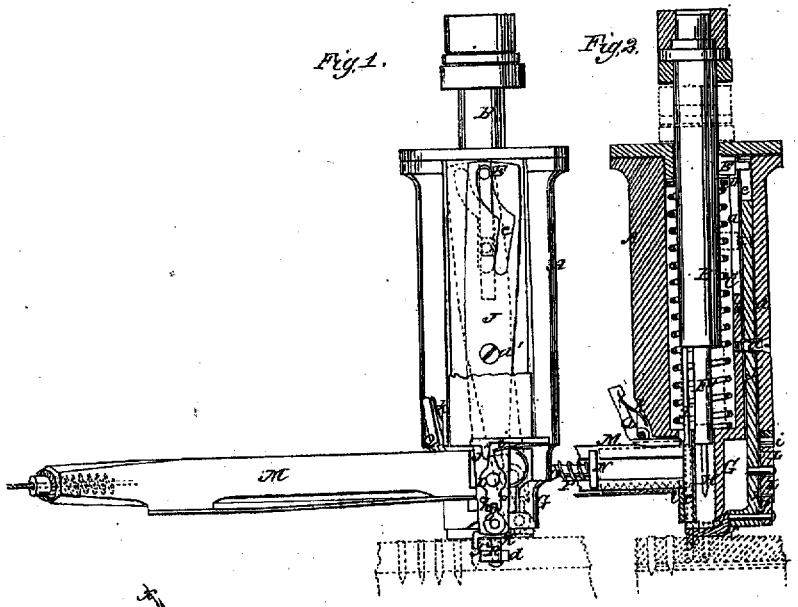
Fig. 2.
Fig. 3.
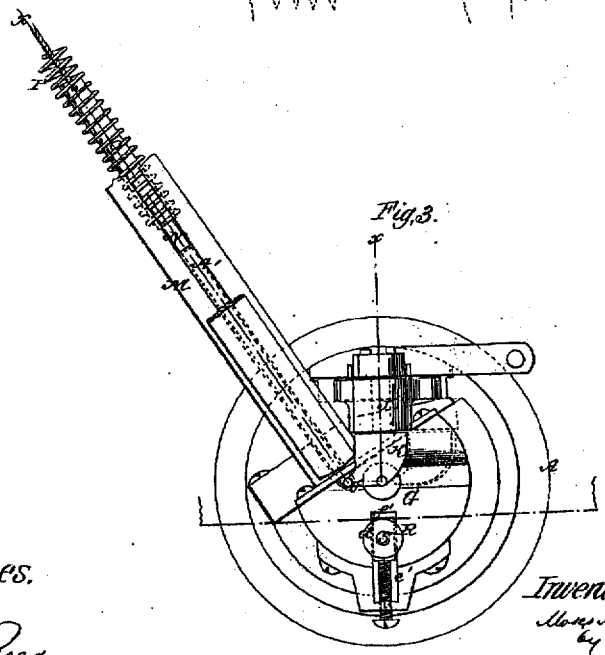
Witnesses.
Geo. Coombs
G. W. Reed
Inventor.
Mary Marshall
by Munn & Co.
N. PETERS, PHOTO-LITHOGRAPHER, WASHINGTON, D. C.

NO DRAWING AVAILABLE

UNITED STATES PATENT OFFICE.

MOSES MARSHALL, OF LOWELL, ASSIGNOR TO S. S. BUCKLIN, OF BROOKLINE, MASSACHUSETTS.

IMPROVEMENT IN PEGGING-MACHINES.

Specification forming part of Letters Patent No. 33,679, dated November 5, 1861; Reissue No. 1,296, dated March 25, 1862.

*To all whom it may concern:*

Be it known that I, MOSES MARSHALL, of Lowell, in the county of Middlesex and the State of Massachusetts, have invented certain Improvements in Machines for Pegging Boots and Shoes, of which the following is a full, clear, and exact description, reference being had to the accompanying drawings, making part of this specification, in which—

Figure 1 is a side view of my pegger, a portion of the case being removed to show the parts within; Fig. 2, a vertical section on the line *x x* of Fig. 3; Fig. 3, an underneath view of the same enlarged; Figs. 4, 5, and 6, details to be referred to hereinafter.

My present invention has for its object to perfect the application of an automatic feed to machines for pegging boots and shoes; and it consists in the employment of a feeding-point so arranged as to enter the hole last made by the awl, (instead of making a new hole for the purpose,) and to feed the machine along the sole between each descent of the plunger.

To enable others skilled in the art to understand my invention, I will proceed to describe the manner in which I have carried it out.

The cylinder A is not materially unlike the body or casing of other machines of this class. The awl H is attached to a rod, F, which is secured to the bottom of the plunger B, and is of a size to adapt it to slide freely in a cylindrical passage, G, bored through the bottom of the casing. The peg-driver I, which is also attached to the plunger, descends through a suitable passage, *c*, which is open upon one side to admit the pegs from the peg-trough, as will presently be more fully described. The awl is driven into the leather and the pegs into the holes made by the awl by a blow of a hand-hammer upon the top of the plunger, and the awl is extracted from the leather by an india-rubber spring, W, immediately beneath the head of the plunger, which is compressed between the plate *g* on the head of the plunger and the cap-plate *h* of the casing by the blow of the hammer. The plunger is raised by a spiral spring, C, the upper end of which bears on a ring, D, that rests against the pin E, projecting from the plunger.

The motion of the machine along the edge of the sole for the purpose of spacing the distances between the pegs is accomplished by the feeding-point *f*, which is actuated by the following means: To the interior of one side of the body or case A is pivoted, at *d*, a lever, J, having in its upper end an irregular slot, *e*, cut through it, of the form seen in the drawings. In this slot works a pin, E, projecting from the plunger B, so as to vibrate the lever J back and forth as the plunger rises and descends. The pin E also passes through a straight slot, *m*, in a division-plate, *b*, and thus the plunger is prevented from turning. To the bottom of the lever J is pivoted the feeding-point *f*, which is attached to one end of the swivel-pin *a*, and is so actuated that on the rising of the plunger it shall first be thrust into the hole last made by the awl, and then by the continued upward motion of the plunger be fed along so as to bring the peg and peg-driver directly over the hole. On the descent of the plunger the feeding-point is first with-drawn from the hole, leaving it ready to be occupied by the peg, and is then carried back out of the way of the awl, which now descends to make a new hole, and on the plunger again rising the feeding-point enters this new hole and feeds the machine along. These motions are effected in the following manner: The feeding-point, as before stated, is secured to a swivel-pin, *a*, which turns freely in the bottom of the lever J. To the other end of this pin is secured a tooth, *v*, which engages with a notch in the lever L, pivoted to the lever J. *j* is a stationary stop secured to the body of the machine, and *i* is a movable stop which is forced down by a spring, *z*, the office of the stops *j* and *i* being to hold the lever L in position at certain times, while at others it is allowed to escape from their control.

The operation of this part of the mechanism is as follows: When the plunger is up, Fig. 1, the end of the lever L has forced up the spring-stop *i* and is held stationary by the stops *j* and *i*, the point *f* remaining in the hole in the sole, immediately beneath the peg-driver and peg. As the plunger commences to descend, Fig. 4, the motion of the pin E in the curved portion of the slot *e* vibrates the lever J to one side. While this is taking place the upper end of the lever L being held stationary by the stops *i* and *j*, this lever is vibrated, and also the pin *a*; but as the tooth *r* is held by the notch in the lever L, and is moved with it, the pin *a* is caused to turn, and the feeding-point *f* is withdrawn from the hole in the sole, as seen in Fig. 4. So soon as this has taken place, the lever L strikes against a pin, 2, on the lever J, by which the motion of the lever L upon its pivot is arrested and its upper end slips past the spring-catch *i*, when, by the continued motion of the lever J, the feeding-point is carried back, Fig. 5, out of the way of the peg-driver and awl, which are now, while the pin E is descending through the vertical portion of its slot *e*, left free to descend for the purpose of making a new hole and of driving a peg into the one previously made. As the plunger ascends, it is necessary that the feeding-point go through a different set of motions, which are produced as follows: While the pin E is ascending through the vertical portion of the slot *e* the feeding-point remains stationary, and during the interval the awl has risen clear of the path of this point. The pin E now enters the inclined portion of the slot *e*, and the feeding-point begins to travel back, being still raised above and clear of the surface of the leather. On the feeding-point arriving opposite to the hole last made by the awl, the upper end of the lever L strikes against the spring-stop *i*, Fig. 6, by which the point F is forced down into the hole, and at this juncture the lever L strikes against a pin, 3, upon its opposite side, by which its motion on its pivot is arrested and the parts are caused to travel with the lever J, the feeding-point causing the machine to move over the surface of the leather, while the upper end of the lever L pushes back the spring-stop *i*, and the parts are again left in the position seen in Fig. 1.

M is the peg-trough, which is attached to the lower end of the cylinder A. The follower N rests against the end of the peg-strip, and is forced up for the purpose of feeding the pegs by a spiral spring, P, which encircles the rod O of the follower. The peg-trough communicates at its inner end with the passage *c*, in which the peg-driver I works. Q is an elbow-lever which is pivoted to the cylinder. The lower arm of this lever, which is elevated by a spring, *k*, works through an opening in the top of the peg-trough, and by the pressure of the finger may be caused to press upon the peg-strip and stop the feed. The splitting-knife *l* is stationary, and is placed immediately beneath the point where the opening in the peg-trough communicates with the passage *c*.

The gage R, by means of which the distance of the pegs from the edge of the sole is regulated, consists of a roller, *d*, on the end of a bar, *s*, which is adjusted in position by means of a screw, *p*, and spring *t*.

Operation: The peg-trough M is supplied with peg-strips A′, (shown in red,) which are made in the usual way. The operator, holding the cylinder A with his left hand, presses in the lever Q, by which the feeding of the pegs is prevented. He then strikes the head of the plunger and discharges the peg which is already in the passage *c*. After this no more pegs will be cut off or driven until the lever Q is released. He now places the machine upon the sole, the stop R resting upon the edge of the sole and regulating the distance to which the pegs shall be placed from the edge. A blow is now given to the plunger by which the awl is driven into the sole, from which it is again extracted by the india-rubber spring W. As the spring C continues to carry up the plunger, the feeding-point enters the hole just made by the awl, and then continues its motion, as already described, carrying the machine with it a distance equal to the distance between two pegs. The lever Q is now released, and the peg-strip is forced forward into the passage *c* by the spring P. It will be seen on inspection of Fig. 2 that the machine has been so moved by the point *f* as to bring the hole last made by the awl immediately beneath the passage *c*. A second blow is now given to the plunger B, by which the point *f* is first withdrawn from the hole in the sole and retracted out of the way of the awl and peg-driver, the latter at the same time pressing down the strip of peg-wood and splitting off a single peg, the spring in the bottom of the peg-trough yielding to permit the peg strip to descend sufficiently for the purpose. As the plunger continues to descend, the peg-driver forces the peg into the hole beneath it, and the awl enters the sole and makes a new hole. These operations are continued by successive blows of the hammer upon the plunger until the pegging is completed. When it is required to make the holes simply, to be afterward filled with metallic nails, the feeding of the pegs is interrupted by pressure upon the lever Q, as before explained.

Among the advantages which the above method of feeding possesses may be enumerated the following: First, the sole is not scratched or marred by the punctures of the feeding-instrument; second, the feeding-point may be made stout and blunt, and will always engage sufficiently with the sole to insure the feed; third, the feed will always be uniform and without any liability to vary arising from the slipping of the feeding-point or its failure to engage with the sole; fourth, while the feeding-point is in the hole beneath the awl-driver the instrument may be turned in any direction around this point without in the least affecting the relative position of the pegs.

What I claim as my invention, and desire to secure by Letters Patent, as an improvement in machines for pegging boots and shoes, is—

A feeding-point so arranged and operated as to enter the hole previously made by the awl and move the machine along, for the purpose set forth.

MOSES MARSHALL.

In presence of—
J. N. MARSHALL,
A. P. BONNEY.